United States Patent [19]

Atkinson et al.

[11] Patent Number: 4,915,871
[45] Date of Patent: Apr. 10, 1990

[54] WATER RESISTANCE OF FINE-VERMICULITE ARTICLES

[75] Inventors: Alan W. Atkinson, Rugby; Jody K. Burnett, Northamptonshire, both of United Kingdom

[73] Assignee: T&N Technology, Limited, Manchester, England

[21] Appl. No.: 337,413

[22] Filed: Apr. 13, 1989

[30] Foreign Application Priority Data

Apr. 26, 1988 [GB] United Kingdom ............... 8809820

[51] Int. Cl.$^4$ .................. C04B 20/06; C04B 31/22; C04B 31/26
[52] U.S. Cl. ................................ 252/378 R
[58] Field of Search ............. 252/378 R, 378 P; 106/75, 86, 122; 501/141; 423/164

[56] References Cited

U.S. PATENT DOCUMENTS 1,972,390 9/1934 Miner ........................... 252/378 R
4,269,628 5/1981 Ballard et al. ................ 252/378 R
4,539,046 9/1985 McAloon et al. ............. 252/378 R

FOREIGN PATENT DOCUMENTS 1016385 1/1966 United Kingdom .

Primary Examiner—Robert L. Stoll
Assistant Examiner—Steven J. Bos
Attorney, Agent, or Firm—Nixon & Vanderhye

[57] ABSTRACT

Certain articles required to function in air at temperatures of 250° C. or higher comprise very fine particles of vermiculite from which the interstitial magnesium ions have been at least partially removed and which has been swollen in water. These articles are not ordinarily exposed to water when in use, but if they are they are likely to disintegrate quickly because of the ready dispersibility of the vermiculite particles. By the invention, water-resistance is given to such articles by treating them with a solution of an aluminate salt e.g. $NaAlO_2$ or a zirconyl salt e.g. $ZrOCl_2$.

8 Claims, No Drawings

WATER RESISTANCE OF FINE-VERMICULITE ARTICLES

This invention is concerned with improving the water-resistance of fine-vermiculite articles.

Certain articles required to function in air at temperatures of 250° C. or higher comprise very fine particles of chemically exfoliated vermiculite (CEV), that is to say vermiculite from which the interstitial magnesium ions have been at least partially removed and which has been swollen in water. Examples of such articles are: a heat shield consisting of foil obtained by evaporation of an aqueous colloidal dispersion of the particles; a rigid foam whose high content of CEV enables the foam to confer a substantial degree of protection against fire on whatever it is attached to; and the sealing element of a gasket for the exhaust system of an internal combustion engine, said element being composed of thermally exfoliated vermiculite whose relatively coarse particles are bound together by CEV particles.

Once put into use, these articles are not ordinarily exposed to water; but if they are, then they are likely to disintegrate quickly or at least lose the fine particles of CEV that are important to their performance at elevated temperature, because the particles—having a diameter of the order of only 100 $\mu$m—are readily dispersed by water.

According to the present invention, there is provided a process for improving the water-resistance of an article which comprises very fine particles of vermiculite from which the interstitial magnesium ions have been at least partially removed and which has been swollen in water, in which process the article is brought into contact with a solution of an aluminate or a zirconyl salt.

Preferably, the salt employed is an alkali metal aluminate, particularly $NaAlO_2$ or $KAlO_2$. If a zirconyl salt is used, it is preferably a halide, such as $ZrOCl_2$.

A further improvement in water-resistance can be obtained by a subsequent treatment with a solution of a silicone elastomer.

The invention has particular utility in improving the water-resistance of articles comprising gas-exfoliated vermiculite bound together by CEV particles. By 'gas-exfoliation' we include both the exfoliation by steam that occurs when raw vermiculite exfoliates on being flash heated and the exfoliation by oxygen that occurs when raw vermiculite is treated with acidic hydrogen peroxide.

The invention is further illustrated by the Examples given later, in the first four of which there is described the effect of various solutions on strips of fine-vermiculite material prepared as follows:

The following ingredients were mixed with moderate shear to form a stiff paste:
  Thermally exfoliated vermiculite (MANDOVAL superfine grade, passing a 2 mm sieve); 1 kg.
  CEV (WR GRACE GP923; 18% aqueous dispersion); enough to give vermiculite solids: 1 kg.

The paste was spread with a blade onto fine polypropylene gauze to give a layer 2 mm thick, which was dried in an oven at 130° C. During drying a second gauze was laid on top of the layer. After drying, both gauzes were stripped from the dry vermiculite foil which had been formed, leaving surfaces with a fine pattern of disruption through which waterproofing agents could penetrate.

The foil had mass per unit area of 600 g/m$^2$, and was pressed to a sheet of thickness 0.6 mm and density 1000 kg/m$^3$. Strips measuring 80×25 mm were cut from the sheet for use in the Examples.

EXAMPLE 1

A strip was immersed for 30 minutes in an aqueous solution of sodium aluminate ($NaAlO_2$; 1M solution) at room temperature. The strip was then rinsed in water for 10 minutes and dried in an oven at 130° C. Uptake of the aluminate (dry weight) was 2.5% by weight of the strip.

The strip was allowed to stand exposed to the laboratory atmosphere at ambient temperature for 1 day to allow absorption of moisture to equilibrium, and its tensile strength was measured. It was then immersed in water at room temperature for 48 hours, and then submitted while still wet to measurement of tensile strength. Results are compared below with those for untreated strip and those for strip treated with aluminium sulphate solution (1M).

|  | Dry (equilibrium) tensile strength | Wet tensile strength after 48 hrs immersion |
| --- | --- | --- |
| Untreated strip | 0.5 MPa | Disintegrated |
| Strip treated with 1M-$Al_2(SO_4)_3$ | 0.6 MPa | 0.1 MPa |
| Strip treated with 1M-$NaAlO_2$ | 1.4 MPa | 0.3 MPa |

Treatment with aqueous 1M-$KAlO_2$ gave results substantially identical with those shown for the sodium salt.

EXAMPLE 2

Following generally the procedure of Example 1, a strip was treated with an aqueous solution of zirconyl chloride (1M-$ZrOCl_2$) and then tested. Results were:

|  | Dry (equilibrium) tensile strength | Wet tensile strength after 48 hrs immersion |
| --- | --- | --- |
| Untreated strip | 0.5 MPa | Disintegrated |
| Strip treated with 1M-$ZrOCl_2$ | 0.5 MPa | 0.3 MPa |

EXAMPLE 3

This Example illustrates the extent to which the improved wet strength imparted by $NaAlO_2$ and $ZrOCl_2$ treatments is retained after several hours heating.

|  | Tensile strength (MPa) after 8 hours at 300° C. | |
| --- | --- | --- |
|  | Dry | Wet, after 72 hrs cold $H_2O$ immersion |
| Untreated strip | 0.67 | Disintegrated |
| Treated ($NaAlO_2$) strip | 1.63 | 0.23 |
| Treated ($ZrOCl_2$) strip | 0.92 | 0.20 |

EXAMPLE 4

This Example illustrates the further improvement in wet strength which can be obtained by a post-treatment with a silicone elastomer.

The dry product of Example 1 was impregnated with a 15% by weight solution in toluene of the silicone elastomer sold under the name CONFORMAL ® (Dow Corning) (R-4-3117). The impregnated strip (silicone solids uptake, 3% by weight) was dried, and after an initial pre-cure heating (10 minutes at 50°–70° C.) was cured by heating at 130° C. for 30 minutes. Results of strength testing were:

| Dry tensile strength | | After silicone treatment | | |
|---|---|---|---|---|
| | | Tensile strength after | | Tensile strength after |
| before silicone treatment | after silicone treatment | 3 days immersion cold $H_2O$ | Dry | 8 hours at 300° C. 3 days $H_2O$ |
| 1.40 MPa | 2.20 MPa | 0.60 MPa | 2.24 | 0.58 |

EXAMPLE 5

This Example illustrates the improvement in strength obtainable in a strip 25–75 μm thick of chemically exfoliated vermiculite cut from a foil prepared by evaporation at ambient temperature of a dilute (5% solids) aqueous dispersion of the material (GP923) specified in Example 1.

Treatment was by immersion for 4 hours in a 7% by weight solution of $NaAlO_2$. Results of strength tests were:

| | Dry tensile strength | Wet tensile strength after 2 hours $H_2O$ immersion |
|---|---|---|
| Untreated strip | 8 MPa | Disintegrated |
| Treated ($NaAlO_2$) strip | 12–16 MPa | 0.1–0.5 MPa |

We claim:
1. A process for improving the water-resistance of an article which comprises very fine particles, having a diameter of about 100 μm, of vermiculite from which the interstitial magnesium ions have been at least partially removed and which has been swollen in water, in which process the article is brought into contact with a solution of an aluminate.
2. A process according to claim 1, in which the salt employed is an alkali metal aluminate.
3. A process according to claim 2, in which the salt is sodium or potassium aluminate.
4. A process for improving the water-resistance of an article which comprises gas-exfoliated vermiculite bound together by very fine particles, having a diameter of about 100 μm, of vermiculite from which the interstitial magnesium ions have been at least partially removed and which has been swollen in water, in which process the article is brought into contact with a solution of a salt selected from aluminates and zirconyl salts.
5. A process according to claim 1, in which the treated article is subsequently brought into contact with a solution of a silicone elastomer.
6. A process according to claim 4, in which the salt employed is zirconyl chloride.
7. A process according to claim 6, in which the salt employed is an alkali metal aluminate.
8. A process according to claim 7, in which the salt is sodium or potassium aluminate.

* * * * *